United States Patent
Evans, V et al.

(10) Patent No.: US 9,767,728 B2
(45) Date of Patent: Sep. 19, 2017

(54) LIGHT SENSOR BENEATH A DUAL-MODE DISPLAY

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/336,380

(22) Filed: Oct. 27, 2016

(65) Prior Publication Data
US 2017/0124942 A1  May 4, 2017

Related U.S. Application Data

(60) Provisional application No. 62/249,130, filed on Oct. 30, 2015, provisional application No. 62/300,631, (Continued)

(51) Int. Cl.
*G09G 3/32* (2016.01)
*G09G 3/3208* (2016.01)
(Continued)

(52) U.S. Cl.
CPC ....... *G09G 3/3208* (2013.01); *G02B 27/0093* (2013.01); *G02B 27/017* (2013.01);
(Continued)

(58) Field of Classification Search
CPC   G09G 3/3208; G09G 2360/144; G06F 3/005; G06F 3/012; G06F 3/013;
(Continued)

(56) References Cited

U.S. PATENT DOCUMENTS

| 4,928,301 A | 5/1990 | Smoot |
| 5,466,926 A | 11/1995 | Sasano et al. |

(Continued)

OTHER PUBLICATIONS

International Search Report and Written Opinion in PCT/US16/59550 mailed Jan. 3, 2017, 10 pages.
(Continued)

*Primary Examiner* — Stephen Sherman
(74) *Attorney, Agent, or Firm* — Perkins Coie LLP

(57) ABSTRACT

The technology disclosed here integrates a light sensor with a dual-mode display, thus increasing the size of the dual-mode display. The light sensor can be a camera, an ambient sensor, a proximity sensor, etc. The light sensor is placed beneath the dual-mode display and can detect incoming light while the dual-mode display is displaying a display image. The dual-mode display and the light sensor can operate at the same time. For example, a camera placed beneath the dual-mode display can record an image of the environment, while at the same time the dual-mode display is showing the display image. Further, multiple light sensors can be placed at various locations beneath the dual-mode display.

24 Claims, 10 Drawing Sheets

Related U.S. Application Data filed on Feb. 26, 2016, provisional application No. 62/319,099, filed on Apr. 6, 2016, provisional application No. 62/373,910, filed on Aug. 11, 2016.

(51) Int. Cl.
   *G06F 3/01* (2006.01)
   *G02B 27/01* (2006.01)
   *G02B 27/00* (2006.01)
   *G06F 3/00* (2006.01)

(52) U.S. Cl.
   CPC ............. *G06F 3/012* (2013.01); *G06F 3/013* (2013.01); *G02B 2027/014* (2013.01); *G02B 2027/0138* (2013.01); *G02B 2027/0178* (2013.01); *G06F 3/005* (2013.01); *G09G 2360/144* (2013.01)

(58) Field of Classification Search
   CPC ............. G02B 27/0093; G02B 27/017; G02B 2027/0138; G02B 2027/014; G02B 2027/0178
   USPC ........................................................ 345/207
   See application file for complete search history.

(56) References Cited

U.S. PATENT DOCUMENTS

| | | | |
|---|---|---|---|
| 5,828,406 A | 10/1998 | Tredwell et al. | |
| 6,107,618 A | 8/2000 | Fossum et al. | |
| 6,627,907 B1 | 9/2003 | Cole et al. | |
| 6,867,821 B2 | 3/2005 | De Schipper | |
| 6,876,143 B2 | 4/2005 | Daniels | |
| 6,885,157 B1 | 4/2005 | Cok et al. | |
| 7,130,011 B2 | 10/2006 | Hsieh et al. | |
| 7,697,053 B2 | 4/2010 | Kurtz et al. | |
| 8,103,085 B1 | 1/2012 | Zadeh | |
| 8,576,325 B2 | 11/2013 | Dudek et al. | |
| 8,867,015 B2 | 10/2014 | Posner et al. | |
| 9,057,931 B1 | 6/2015 | Baldwin | |
| 9,204,089 B2 | 12/2015 | Nagano et al. | |
| 2002/0089467 A1* | 7/2002 | Hara .................... | G02B 27/017 345/4 |
| 2004/0212555 A1 | 10/2004 | Falco | |
| 2004/0257473 A1 | 12/2004 | Miyagawa | |
| 2006/0136846 A1 | 6/2006 | Im et al. | |
| 2007/0002130 A1 | 1/2007 | Hartkop | |
| 2007/0081094 A1 | 4/2007 | Ciudad et al. | |
| 2007/0109239 A1 | 5/2007 | Den Boer et al. | |
| 2007/0247439 A1 | 10/2007 | Daniel et al. | |
| 2008/0068484 A1 | 3/2008 | Nam | |
| 2008/0106628 A1 | 5/2008 | Cok et al. | |
| 2008/0165267 A1 | 7/2008 | Cok | |
| 2008/0292144 A1 | 11/2008 | Kim | |
| 2009/0102763 A1 | 4/2009 | Border et al. | |
| 2009/0121619 A1 | 5/2009 | Rajan et al. | |
| 2009/0153652 A1 | 6/2009 | Barenbrug | |
| 2009/0322706 A1 | 12/2009 | Austin | |
| 2010/0044121 A1 | 2/2010 | Simon et al. | |
| 2010/0060552 A1* | 3/2010 | Watanabe ............ | G02B 27/017 345/8 |
| 2010/0073518 A1 | 3/2010 | Yeh | |
| 2010/0118179 A1 | 5/2010 | Ciudad et al. | |
| 2010/0182446 A1 | 7/2010 | Matsubayashi | |
| 2011/0164047 A1 | 7/2011 | Pance | |
| 2011/0248155 A1 | 10/2011 | Chen | |
| 2011/0279689 A1 | 11/2011 | Maglaque | |
| 2012/0074227 A1 | 3/2012 | Ferren et al. | |
| 2012/0105400 A1 | 5/2012 | Mathew et al. | |
| 2012/0287327 A1 | 11/2012 | Border et al. | |
| 2013/0135268 A1* | 5/2013 | Kanade ................ | H04N 5/2254 345/207 |
| 2013/0135328 A1* | 5/2013 | Rappoport ............ | G06F 3/0481 345/522 |
| 2013/0147764 A1 | 6/2013 | Chaji et al. | |
| 2013/0182062 A1 | 7/2013 | Son et al. | |
| 2013/0207896 A1 | 8/2013 | Robinson et al. | |
| 2013/0221856 A1 | 8/2013 | Soto et al. | |
| 2013/0242479 A1 | 9/2013 | Yoo et al. | |
| 2013/0251215 A1 | 9/2013 | Coons | |
| 2013/0278516 A1 | 10/2013 | Nagata et al. | |
| 2013/0322752 A1 | 12/2013 | Lim et al. | |
| 2014/0036168 A1 | 2/2014 | Ludwig et al. | |
| 2014/0208417 A1 | 7/2014 | Robison | |
| 2014/0232956 A1 | 8/2014 | Kwon et al. | |
| 2014/0267850 A1 | 9/2014 | Li et al. | |
| 2015/0049165 A1 | 2/2015 | Choi | |
| 2015/0212583 A1 | 7/2015 | Shen et al. | |
| 2015/0271392 A1 | 9/2015 | Musgrave et al. | |
| 2015/0279020 A1 | 10/2015 | Gupta et al. | |
| 2016/0180837 A1 | 6/2016 | Gustavsson et al. | |
| 2017/0123452 A1 | 5/2017 | Evans et al. | |
| 2017/0123453 A1 | 5/2017 | Evans et al. | |
| 2017/0123454 A1 | 5/2017 | Evans et al. | |
| 2017/0124932 A1 | 5/2017 | Evans et al. | |
| 2017/0124933 A1 | 5/2017 | Evans et al. | |
| 2017/0171448 A1 | 6/2017 | Evans et al. | |

OTHER PUBLICATIONS

International Search Report and Written Opinion in PCT/US16/58543 mailed Jan. 3, 2017, 12 pages.

International Search Report and Written Opinion in PCT/US16/58545 mailed Jan. 3, 2017, 12 pages.

International Search Report and Written Opinion in PCT/US16/58548 mailed Jan. 19, 2017, 8 pages.

International Search Report and Written Opinion in PCT/US16/58947 mailed Jan. 13, 2017, 9 pages.

Evans V, et al., International Search Report and Written Opinion received in PCT Application No. PCT/US16/59524, mailed on Feb. 27, 2017; 10 pages.

Evans V, et al., Non-Final Office Action received in U.S. Appl. No. 15/231,652 mailed on Feb. 24, 2017; 26 pages.

Evans V, et al., "Camera Integrated Into a Display", Non-Final Office Action mailed in U.S. Appl. No. 15/231,664 on Feb. 16, 2017; 27 pages.

Non-Final Office Action Mailed Jan. 5, 2017 in U.S. Appl. No. 15/231,643 of Evans et al. filed Aug. 8, 2016, 37 pages.

Non-Final Office Action Mailed Dec. 2, 2016 in U.S. Appl. No. 15/283,204 of Evans et al. filed Sep. 30, 2016, 12 pages.

Non-Final Office Action mailed Dec. 15, 2016 in U.S. Appl. No. 15/283,112 of Evans et al. filed Sep. 30, 2016, 26 pages.

Final Office Action Mailed Mar. 31, 2017 in U.S. Appl. No. 15/231,643 of Evans et al. filed Aug. 8, 2016, 32 pages.

Final Office Action Mailed Apr. 26, 2017 in U.S. Appl. No. 15/231,652 of Evans et al. filed Aug. 8, 2016, 32 pages.

Final Office Action Mailed Apr. 18, 2017 in U.S. Appl. No. 15/283,204 of Evans et al. filed Sep. 30, 2016, 17 pages.

Final Office Action Mailed Apr. 11, 2017 in U.S. Appl. No. 15/231,664 of Evans et al. filed Aug. 8, 2016, 36 pages.

Notice of Allowance dated May 19, 2017, for U.S. Appl. No. 15/283,112 of Evans et al. filed Sep. 30, 2016, 8 pages.

U.S. Appl. No. 15/442,576 of Evans et al. filed Feb. 24, 2017, 38 pages.

U.S. Appl. No. 15/444,320 of Evans et al. filed Feb. 27, 2017, 82 pages.

Advisory Action dated May 12, 2017, for U.S. Appl. No. 15/231,643 of Evans et al. filed Aug. 8, 2016, 4 pages.

Advisory Action dated May 30, 2017, for U.S. Appl. No. 15/231,664 of Evans, D.J. et al. filed Aug. 8, 2016.

Non-Final Office Action dated Jun. 6, 2017 for U.S. Appl. No. 15/231,643 of Evans, D.J. et al. filed Aug. 8, 2016.

International Search Report and Written Opinion dated May 18, 2017, for International Application No. PCT/US2017/19790 filed Feb. 27, 2017, 8 pages.

Non-Final Office Action dated Jun. 26, 2017, for U.S. Appl. No. 15/442,576 of Evans et al. filed Feb. 24, 2017.

(56) References Cited

OTHER PUBLICATIONS

Non-Final Office Action dated Jun. 23, 2017 in U.S. Appl. No. 15/231,664 of Evans et al.
Advisory Action dated Jul. 6, 2017, for U.S. Appl. No. 15/283,204 of Evans et al. filed Sep. 30, 2016.
Notice of Allowance dated Jul. 14, 2017 in U.S. Appl. No. 15/231,652 of Evans et al. filed Aug. 8, 2016.
Notice of Allowance dated Aug. 1, 2017, for U.S. Appl. No. 15/444,320 of Evans et al. filed Feb. 27, 2017.

* cited by examiner

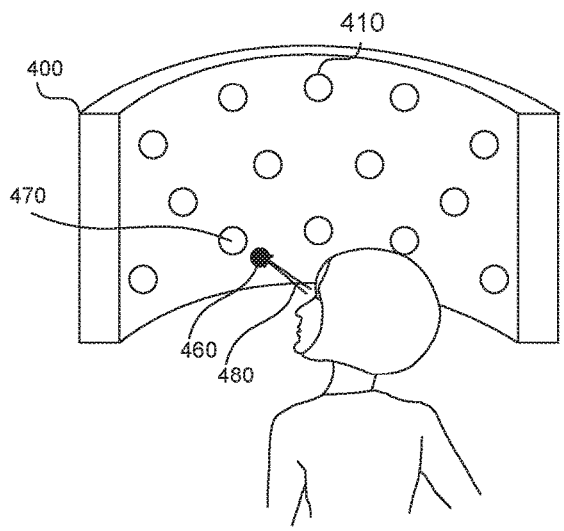
FIG. 4A
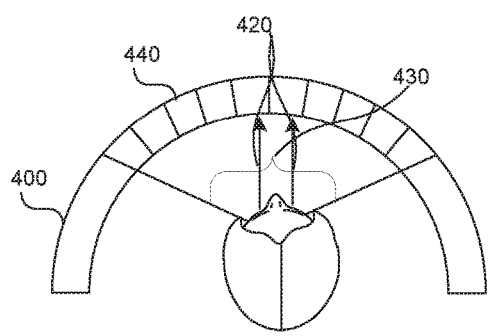 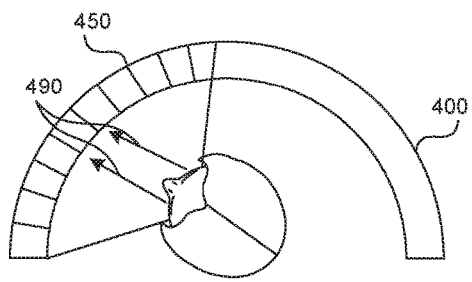
FIG. 4B          FIG. 4C

LIGHT SENSOR BENEATH A DUAL-MODE DISPLAY

CROSS-REFERENCE TO RELATED APPLICATIONS

This application claims priority to U.S. Provisional Patent Application No. 62/249,130, filed on Oct. 30, 2015, U.S. Provisional Application No. 62/300,631, filed on Feb. 26, 2016, U.S. Provisional Application No. 62/319,099, filed on Apr. 6, 2016, and U.S. Provisional Application No. 62/373,910, filed on Aug. 11, 2016, all of which are incorporated by reference herein in their entirety.

TECHNICAL FIELD

The present application is related to a light sensor, and more specifically to methods and systems that incorporate the light sensor beneath a dual-mode display.

BACKGROUND

Present day cameras and electronic displays, when integrated into the same device, occupy separate regions of the device. A region of the device associated with the camera does not function as a display, while a region of the device functioning as the electronic display does not function as a camera.

SUMMARY

The technology disclosed here integrates a light sensor with a dual-mode display, thus increasing the size of the dual-mode display. The light sensor can be a camera, an ambient sensor, a proximity sensor, etc. The light sensor is placed beneath the dual-mode display and can detect incoming light while the dual-mode display is displaying a display image. The dual-mode display and the light sensor can operate at the same time. For example, a camera placed beneath the dual-mode display can record an image of the environment, while at the same time the dual-mode display is showing the display image. Further, multiple light sensors can be placed at various locations beneath the dual-mode display.

BRIEF DESCRIPTION OF THE DRAWINGS

FIG. 4A shows a curved dual-mode display with multiple light sensors placed underneath the display, according to one embodiment.

FIGS. 4B-4C show a top view of the curved dual-mode display 410, according to one embodiment.

DETAILED DESCRIPTION

Technology

The technology disclosed here integrates a light sensor with a dual-mode display, thus increasing the size of the dual-mode display. The light sensor can be a camera, an ambient sensor, a proximity sensor, etc. The light sensor is placed beneath the dual-mode display and can detect incoming light while the dual-mode display is displaying a display image. The dual-mode display and the light sensor can operate at the same time. For example, a camera placed beneath the dual-mode display can record an image of the environment, while at the same time the dual-mode display is showing the display image. Further, multiple light sensors can be placed at various locations beneath the dual-mode display.

Figure 1A:
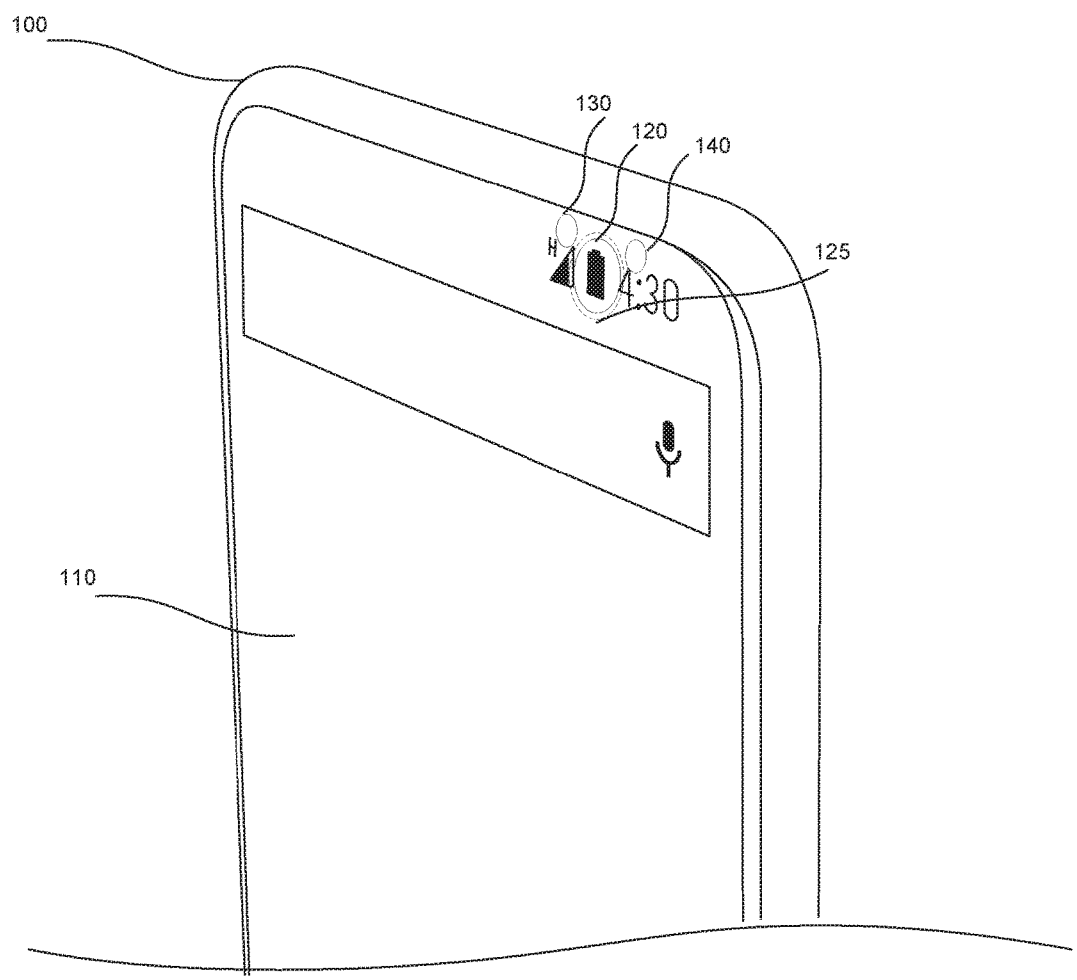
FIG. 1A shows a light sensor beneath a dual-mode display, according to one embodiment.

FIG. 1A shows a light sensor beneath a dual-mode display, according to one embodiment. A mobile device 100 includes the dual-mode display 110, a light sensor 120, optional additional light sensors 130, 140, and a display controller (not pictured), such as a processor, to deactivate a selectively addressable region 125 of the dual-mode display 110.

The selectively addressable region 125 can be the same size as the light sensor 120, can be smaller than the light sensor 120, or can be larger than the light sensor 120. The selectively addressable region is placed above the light sensor 120. The selectively addressable region 125 can operate in a transparent mode when the dual-mode display is opaque, and can operate in an opaque mode, with the dual-mode display is transparent. When the selectively addressable region 125 is in the transparent mode, the selectively addressable region allows light to enter and exit through the selectively addressable region 125. For example, when the light sensor 120 is a proximity sensor, the selectively addressable region 125 turns transparent, and allows a beam of light, e.g., an infrared beam of light, from the proximity sensor to exit through the selectively addressable region 125, and enter through the selectively addressable region 125 back to the proximity sensor.

The dual-mode display 110 becomes opaque when displaying opaque portions of a display image. The dual-mode display 110 becomes substantially transparent when not displaying the display image. When the dual-mode display 110 is displaying transparent portions of the image, the dual-mode display 110 can be substantially transparent, the dual-mode display 110 can be opaque, or, the dual-mode display 110 can assume a degree of transparency corresponding to the degree of transparency of the display image. The dual-mode display 110 can be optically transparent to the visible light, infrared light, etc.

The light sensor 120 is placed beneath a selectively addressable region 125 of the dual-mode display 110. The light sensor 120 can be a camera, an ambient sensor, a proximity sensor, etc. The light sensor 120, and the optional additional light sensors 130, 140 can activate and deactivate. When the light sensor 120, and the optional additional light sensors 130, 140 activate, they can detect a property of incoming light, such as frequency, intensity, and/or time of flight of incoming light. For example, when the light sensor 120 is a camera, when the camera is active, the camera records an image, i.e. the camera detects frequency and intensity of incoming light. When the light sensor 120 is an ambient sensor, when the ambient sensor is active, the ambient sensor measures the intensity of ambient light. When the light sensor 120 is a proximity sensor, the proximity sensor emits a light beam, such as an infrared light beam, and measures a time of flight of the emitted light beam. From the time of flight of the emitted light beam, the proximity sensor determines distance to an object.

Figure 1B:
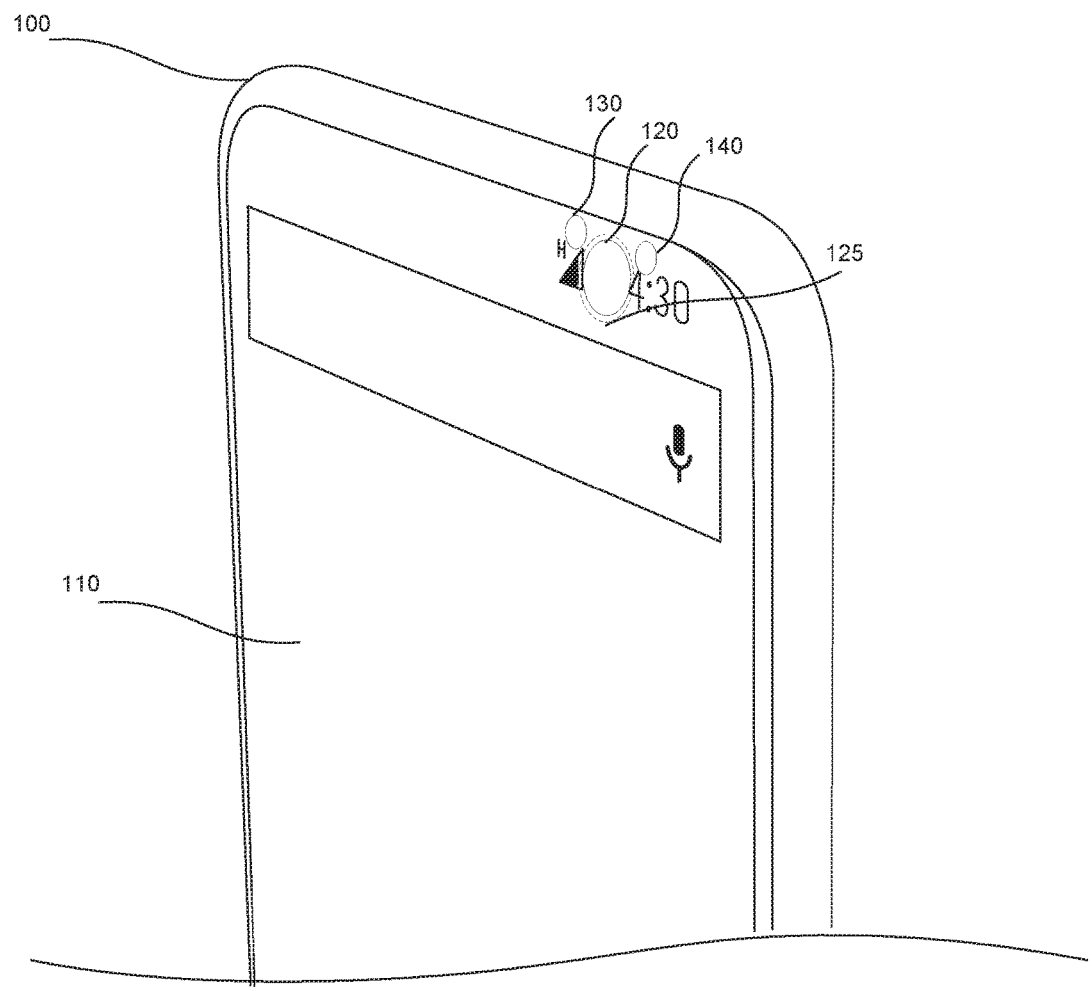
FIG. 1B shows a deactivated selectively addressable region, according to one embodiment.

FIG. 1B shows a deactivated selectively addressable region, according to one embodiment. When the light sensor 120, and/or optional additional light sensors 130, 140 activate, the display controller deactivates the selectively addressable region corresponding to the light sensor 120, and/or the optional additional light sensors 130, 140. The display controller can deactivate to the selectively addressable region by sending a first signal to the selectively addressable region to deactivate, and thus become transparent. Similarly, the display controller can activate the selectively addressable region by sending a second signal to the selectively addressable region to activate. In FIG. 1B, the light sensor 120 is active, and consequently the selectively addressable region 125 of the dual-mode display 110 stops displaying the display image, specifically, the battery icon.

As seen in FIG. 1B, the battery icon disappears from the dual-mode display 110. When the selectively addressable region 125 of the dual-mode display 110 is inactive, the selectively addressable region 125 becomes substantially transparent to enable the light sensor 120 to receive incoming light. In one embodiment, the size of the light sensor 120 is sufficiently small, so that the missing selectively addressable region 125 of the dual-mode display 110 tends to be unnoticeable to a user. Additionally or alternatively, the display controller can deactivate the selectively addressable region 125 for a sufficiently short amount of time, so that the user does not have time to perceive the missing selectively addressable region 125. For example, the sufficiently short amount of time can be less than 1/30 of a second.

Figure 1C:
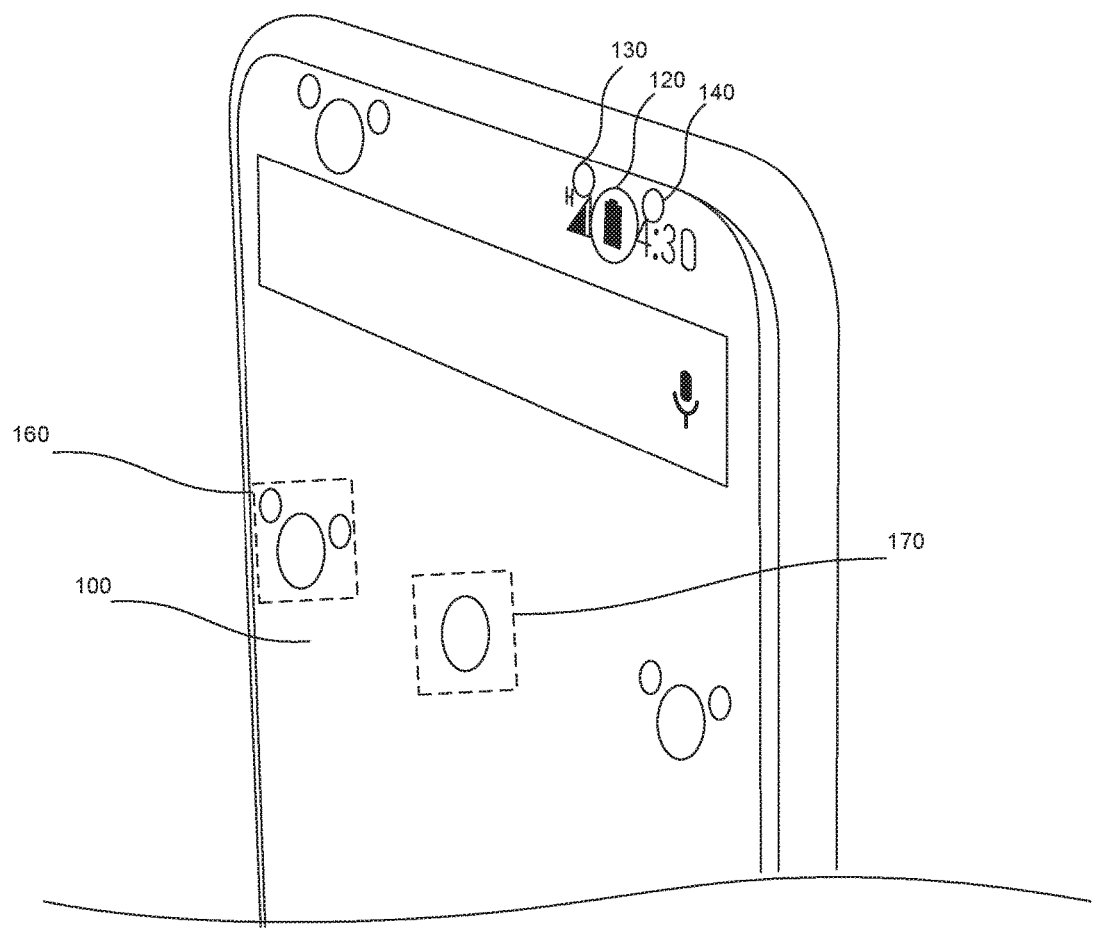
FIG. 1C shows a varying placement of the light sensors 120, 130, 140, according to one embodiment.

FIG. 1C shows a varying placement of the light sensors 120, 130, 140, according to one embodiment. The light sensors 120, 130, 140 can be placed proximate to each other, as seen in placement 160, or can be placed individually, as seen in placement 170. The light sensors 120, 130, 140 can take on various shapes such as a circle, an ellipse, a rectangle, a rectangle with at least one rounded edge, etc. The light sensors 120, 130, 140 can be placed anywhere on the screen, such as in corners of the screen, along the sides of the screen, in the center, etc.

Figure 2:
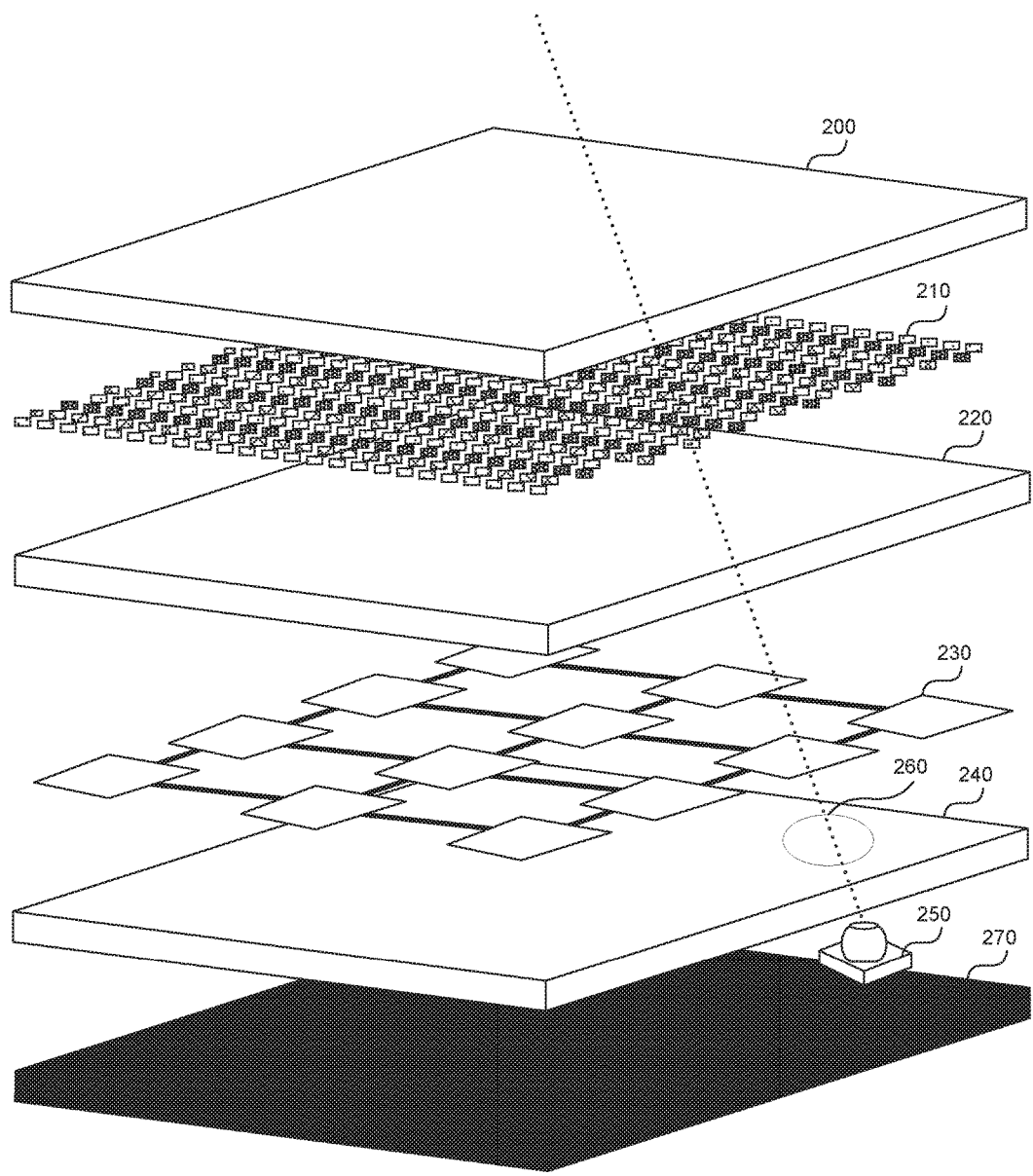
FIG. 2 shows various layers included in a dual-mode display, according to one embodiment.

FIG. 2 shows various layers included in a dual-mode display, according to one embodiment. The dual-mode display includes a cathode layer 200, an organic light emitting diode (OLED) layer 210, an anode layer 220, an optional thin film transistor (TFT) layer 230, and a substrate 240. A light sensor 250, such as a camera, an ambient sensor, a proximity sensor, etc., is placed beneath the dual-mode display.

During operation, a voltage is applied across the OLED layer 210 such that the anode layer 220 is positive with respect to the cathode layer 200. A current of electrons flows through the device from the cathode layer 200 to the anode layer 220. The current of electrons flowing through the OLED layer 210 excites the organic materials in the OLED layer to emit radiation at frequencies in the visible light spectrum.

The optional TFT layer 230 can be used in active matrix organic light emitting diode (AMOLED) displays. The optional TFT layer 230 is not required in passive matrix organic light emitting diode (PMOLED) displays. The activation of each individual OLED, whether in AMOLED or PMOLED displays, can be done in various ways, such as using row and column addressing, or activating each individual OLED, as described herein.

The substrate 240 can be substantially transparent, reflective, opaque, etc. When the substrate 240 is substantially transparent, an opaque layer 270 can be placed beneath the substrate 240 and the light sensor 250, such as an opaque graphite layer. When the substrate 240 is not substantially transparent, the substrate 240 is modified so that a region of the substrate 260 placed above the light sensor 250 is substantially transparent. Further, the region of the substrate 260 can be part of the light sensor 250. For example, the region of the substrate 260 can be a lens focusing light on to the light sensor 250 underneath, such as a camera, an ambient sensor, a proximity sensor, etc.

Figure 3:
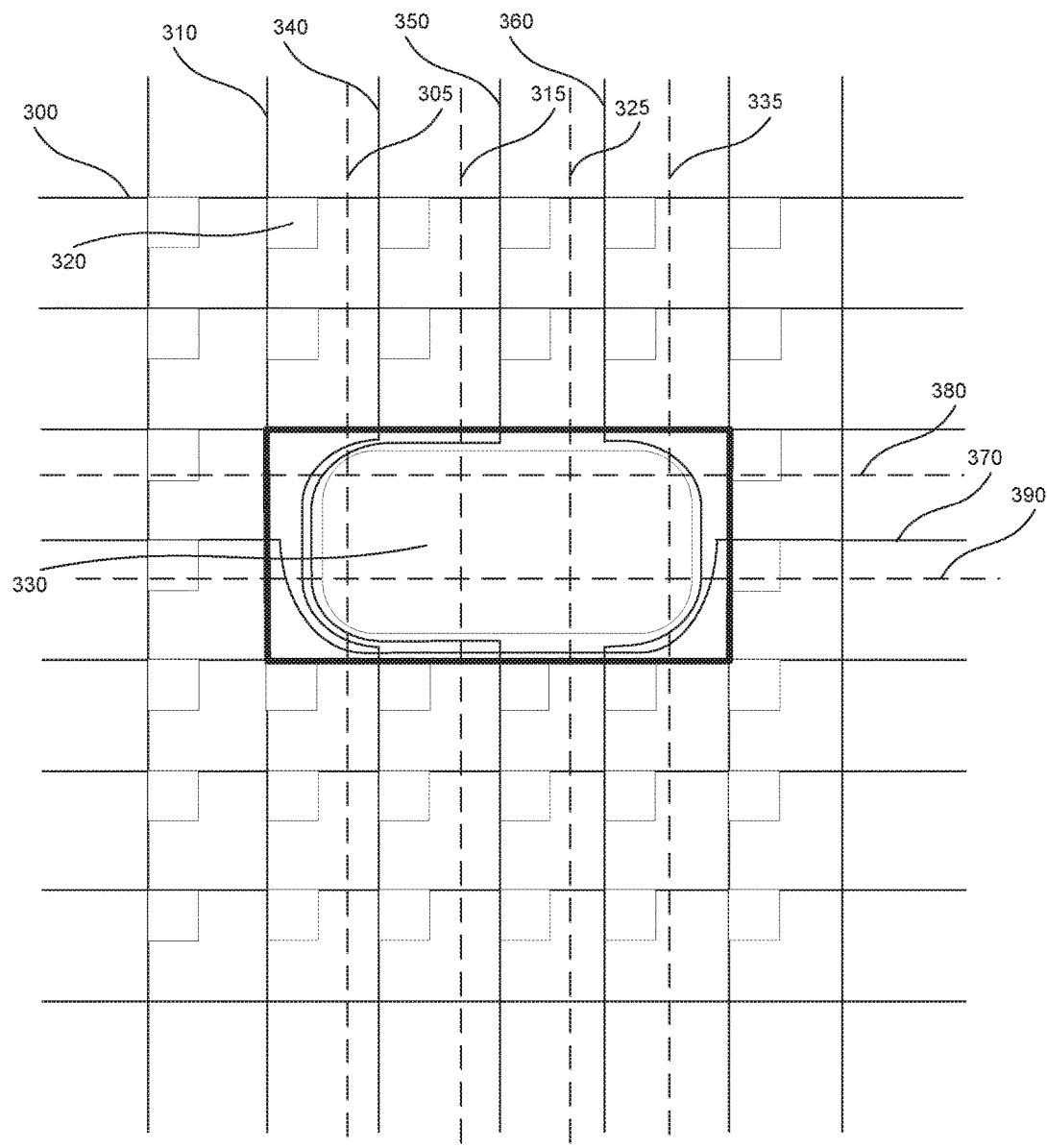
FIG. 3 shows an addressing grid which enables the display controller to selectively turn on and off selectively addressable region, according to one embodiment.

FIG. 3 shows an addressing grid which enables the display controller to selectively turn on and off selectively addressable region, according to one embodiment. A plurality of horizontal electrodes 300 (only one labeled for brevity) and a plurality of vertical electrodes 310 (only one labeled for brevity) intersect beneath the dual-mode display. Each intersection 320 (only one labeled for brevity) is associated with a light emitting element such as an OLED. When both the single horizontal electrode 300 and the single vertical electrode 310 are active, the light emitting element associated with intersection 320 emits light. When either the plurality of horizontal electrodes 300 or the plurality of vertical electrodes 310 are inactive, the light emitting element associated with intersection 320 stops emitting light.

Region 330 corresponds to the selectively addressable region situated above a light sensor. Let us say that the electrodes 340, 350, 360, 370 are straight lines (not pictured), and address the region 330, in addition to the whole dual-mode display. In that case, turning off the electrodes 340, 350, 360, 370 not only turns off the region 330 corresponding to the light sensor, but a whole vertical and horizontal strip of the display corresponding to the electrodes 340, 350, 360, 370 turns off. To turn off the light emitting elements only in the region 330, the display controller needs to be able to address the light emitting elements in the region 330, separately from the light emitting elements associated with the rest of the dual-mode display.

In one embodiment, to create separate addressing for the region 330, two sets of separately addressable electrodes are created. A first set of electrodes is responsible for activating majority of the dual-mode display, while the second set of electrodes is responsible for activating region 330 corresponding to the selectively addressable region placed above the light sensor. The first set of electrodes includes horizontal and vertical electrodes 340, 350, 360, 370 and is responsible for activating the dual-mode display except for the selectively addressable region. The horizontal and vertical electrodes 340, 350, 360, 370 corresponding to the region 330 are routed around the region 330, as shown in FIG. 3. The second set of separately addressable horizontal and vertical electrodes 380, 390, 305, 315, 325, 335 is added, and corresponds to the region 330. The second set of separately addressable horizontal and vertical electrodes 380, 390, 305, 315, 325, 335 can only address the region 330, and cannot address any other part of the dual-mode display. The layout density of the second set of separately addressable horizontal and vertical electrodes 380, 390, 305, 315, 325, 335 can be the same, or can differ from the first set of electrodes. In FIG. 3 the layout density of the second set of electrodes is higher than the layout density of the first set of electrodes.

In another embodiment, each light emitting element can be individually addressable. For example, if there are m×n light emitting elements, there are m×n unique addresses corresponding to each light emitting element. In such a case, to uniquely address region 330 corresponding to the selectively addressable region placed above the light sensor, a memory associated with the display controller, stores the unique addresses of the light emitting elements associated with the region 330. The processor queries the memory for the unique addresses corresponding to the light emitting elements associated with the region 330. If there are multiple regions 330 corresponding to multiple light sensors, the memory stores the ID of the light sensor and the unique addresses of the light emitting elements corresponding to the light sensor. The processor queries the memory for the unique addresses of the light emitting elements associated with the ID of the light sensor, the processor is about to activate.

FIG. 4A shows a curved dual-mode display with multiple light sensors placed underneath the display, according to one embodiment. The curved dual-mode display 400 includes a plurality of light sensors 410 (only one light sensor is labeled for brevity). A light sensor in the plurality of light sensors 410 can be a camera, an ambient sensor, a proximity sensor, etc. The plurality of light sensors 410 can be placed anywhere on the curved dual-mode display 400. For example, the plurality of light sensors 410 can be evenly distributed throughout the curved dual-mode display 400, placed in the corners of the display, the center of the display, the sides of the display, etc.

When the light sensor is a camera, the light sensor can record an image of the user's head. When the user's head is recorded by the plurality of light sensors 410, the processor, using triangulation, can determine a position of the user's head, based on a plurality of images recorded by the plurality of light sensors 410. The position of the user's head can include a three-dimensional position of the user's head, rotation of the user's head, the user's visual focus point 460, and/or the user's gaze direction 480.

Similarly, when the light sensor is a proximity sensor, the light sensor can measure a distance from the light sensor to the user's head. When the distance to the user's head is measured by the plurality of light sensors 410, using triangulation, the processor can determine the position of the user's head, based on a plurality of measurements recorded by the plurality of light sensors 410. The position of the user's head can include a three-dimensional position of the user's head, rotation of the user's head, the user's visual focus point 460, and/or the user's gaze direction 480.

For example, the processor determines the user's visual focus point 460 on the dual-mode display. Based on the user's visual focus point 460, the processor activates the camera 470 closest to the user. The camera 470 records an image of the user. The image so recorded captures the user's gaze. Recording of the user's gaze, by the camera 470 closest to the user, can be useful in teleconferencing applications to create an appearance that the user is always looking at the conversationalist on the other end of the teleconferencing meeting.

FIGS. 4B-4C show a top view of the curved dual-mode display 400, according to one embodiment. Based on the position of the user's head, the processor can display a different display image on the dual-mode display 400.

For example, in FIG. 4B, the processor determines that the direction of the user's gaze 420 is towards the center of the curved dual-mode display 400. The processor then determines the field of view associated with the user's field of view 430. Based on the user's field of view 430, the processor only displays a portion 440 of the image (shaded in FIG. 4B) that the user can see, thereby reducing the load on the resources, such as the memory, the processor, the graphics card, required to generate the image.

Similarly, in FIG. 4C the processor determines that the position of the user's gaze 490 is directed towards a side of the display. Consequently, the processor reduces resource consumption, such as the memory, the processor, and/or the graphics card consumption, by only rendering the portion of the image 450 (shaded in FIG. 4C) that the user can see.

Figure 5:
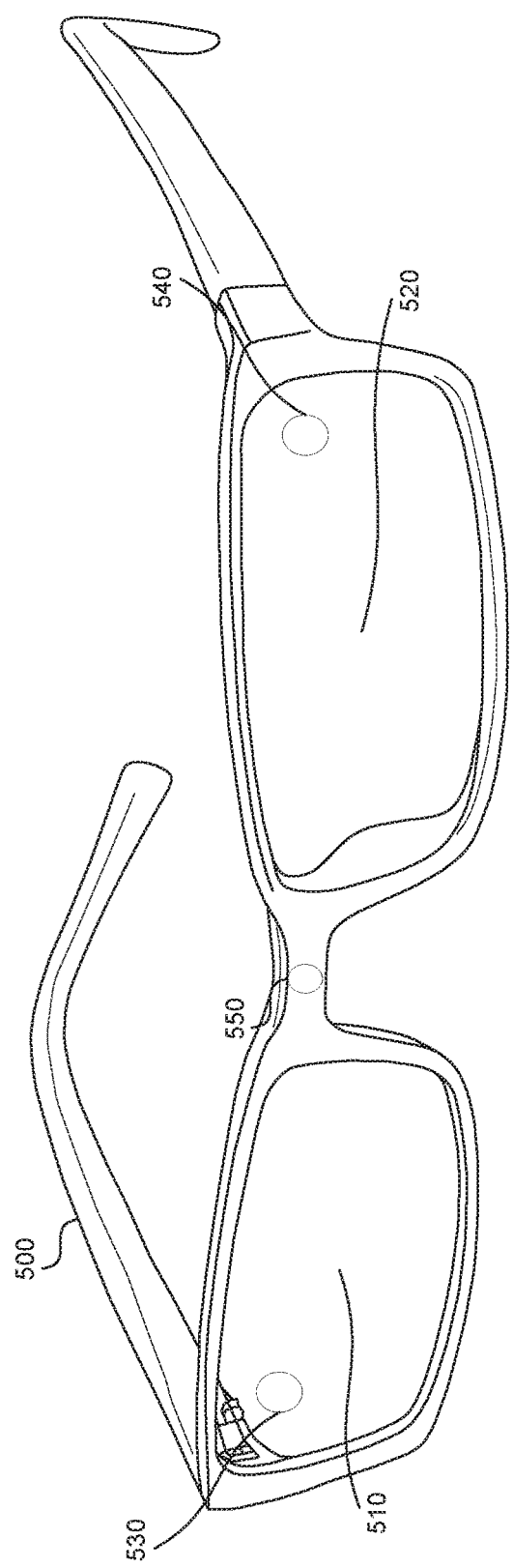
FIG. 5 shows a dual-mode display with a camera placed underneath the display, according to one embodiment.

FIG. 5 shows a dual-mode display with a camera placed underneath the display, according to one embodiment. Glasses 500 include one or more lenses 510, 520, one or more user facing cameras 530, 540, and one or more environment facing cameras 550. The one or more lenses 510, 520 can be prescription lenses, photosensitive lenses, sunglass lenses, etc. Each lens in the one or more lenses 510, 520 includes a dual-mode display, with one or more using facing cameras 530, 540 placed within the dual-mode display. The one or more user facing cameras 530, 540 are oriented towards the user, and can track the direction of the user's gaze. One or more environment facing cameras 550 can be placed on the frame of the glasses 500, or within the one or more lenses 510, 520. The one or more environment facing cameras 550 record the environment that the user sees. Based on the environment that the user sees, and based on the direction of the user's gaze, the processor can display an image to augment the environment around the user. For example, if the user is looking at a barcode of an item, the processor can display cheaper purchasing options of the same item.

Figure 6:
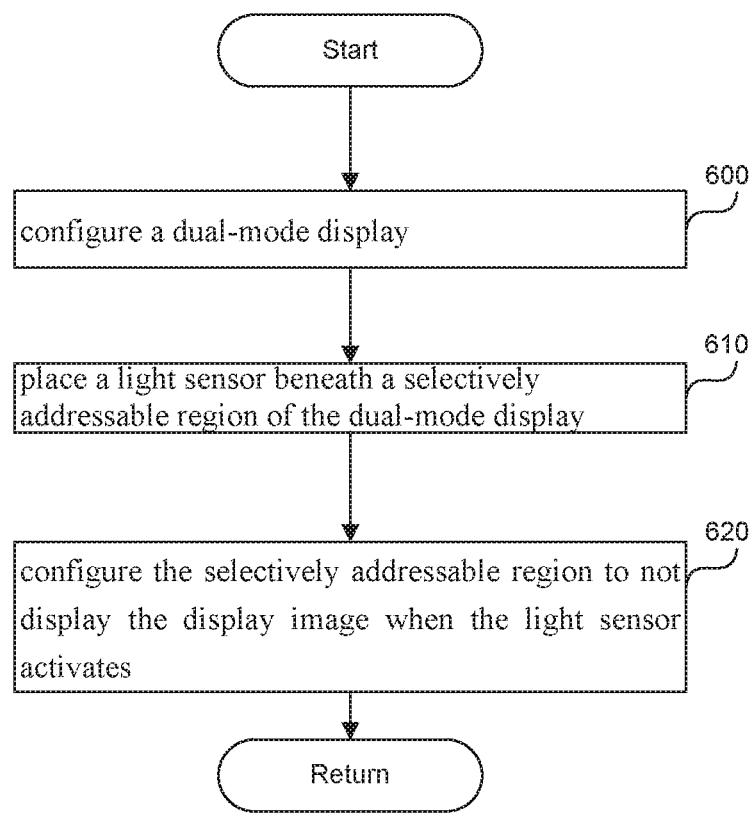
FIG. 6 is a flowchart of a method to place the light sensor beneath the dual-mode display, according to one embodiment.

FIG. 6 is a flowchart of a method to place the light sensor beneath the dual-mode display, according to one embodiment. In step 600, a dual-mode display is configured to become opaque when displaying opaque portions of a display image, and to become substantially transparent when not displaying the display image. When the dual-mode display is displaying transparent portions of the image, the dual-mode display can be substantially transparent, the dual-mode display can be opaque, or, the dual-mode display can assume a degree of transparency corresponding to the degree of transparency of the display image. The dual-mode display can be optically transparent to the visible light, infrared light, etc.

Configuring the dual-mode display includes providing a substantially transparent cathode layer, providing a substantially transparent light emitting layer comprising organic light emitting diodes, providing a substantially transparent anode layer, and providing a substrate. The substrate can be substantially transparent, opaque, reflective, etc. When the substrate is opaque and/or reflective, a region of the substrate is made transparent such that a light sensor placed beneath the substrate can record light coming through the transparent region of the substrate. The region of the substrate above the light sensor can be a lens focusing incoming light to the light sensor. Additionally or alternatively, the region of the substrate can be part of the light sensor.

In addition to the above-mentioned layers, an optional thin film transistor (TFT) layer can be provided to cause the substantially transparent light emitting layer to emit light. When the substrate is substantially transparent, an opaque graphite layer can be placed beneath the substrate and the light sensor.

In step 610, a light sensor is placed beneath a selectively addressable region. The light sensor activates and deactivates. When the light sensor activates the light sensor detects a property of incoming light, such as frequency, intensity, time of travel. The light sensor can be a camera, an ambient sensor, a proximity sensor, etc.

Placing the light sensor includes establishing a correspondence between the light sensor and the selectively addressable region, as described herein. For example, establishing the correspondence can include: configuring a first set of electrodes to activate and to deactivate the dual-mode display except the selectively addressable region; and configuring a second set of electrodes to activate and to deactivate the selectively addressable region.

In another example, establishing the correspondence can include: storing in a memory an identification associated with a plurality of light emitting elements corresponding to the selectively addressable region; and sending the identification associated with the plurality of light emitting elements to a display controller. When there is a plurality of light sensors corresponding to a plurality of selectively addressable regions, the memory stores identification (ID) of the light sensor and an ID of the selectively addressable region, which is associated with the light sensor. The processor can send the ID of the selectively addressable region to the memory, and ask for the identification of the plurality of light emitting elements associated with the sent selectively addressable region ID.

In step 620, the selectively addressable region is configured to not display the display image when the light sensor activates, such that the inactive selectively addressable region tends to be unnoticeable to a user. In one embodiment, the size of the light sensor is sufficiently small, such as less than 3 mm, so that the missing selectively addressable region tends to be unnoticeable to a user. Additionally or alternatively, the display controller can deactivate the selectively addressable region for a sufficiently short amount of time, so that the user does not have time to perceive the missing selectively addressable region. For example, the sufficiently short amount of time can be less than $1/30$ of a second.

In addition, to the steps described above, a plurality of cameras can be placed beneath a plurality of portions of the dual-mode display. The plurality of cameras can record a plurality of images. A processor can be configured to track the user's head, based on the plurality of images recorded by the plurality of cameras. Based on the head tracking the processor can be configured to display a different display image on the dual-mode display. The plurality of cameras can be placed anywhere on the dual-mode display. For example the plurality of cameras can be evenly distributed, can be placed in corners of the display, the center of the display, etc. instead of the plurality of cameras, or in addition to the plurality of cameras, one or more proximity sensors can be used to track the user's head.

In addition to head tracking, the processor can be configured to track the user's eyes, based on a plurality of images recorded by the plurality of cameras. Based on the eye tracking, a camera in the plurality of cameras can be activated, where the camera is closest to the user's focus point on the substantially transfer parent display layer. Activating the camera includes recording, by the camera, an image of the user. The image of the user captures the user's gaze, and can be used in teleconferencing applications to create an appearance of the user is always facing the conversationalist on the other end of a video call.

Figure 7:
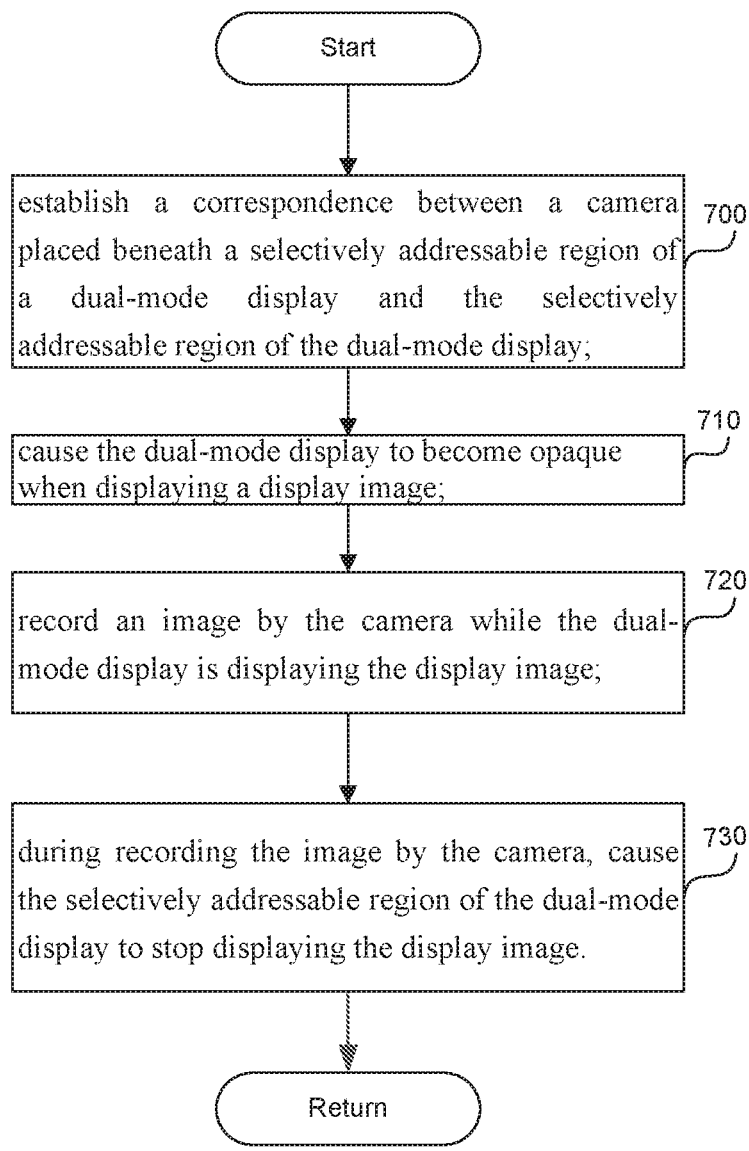
FIG. 7 is a flowchart of a method to place the light sensor beneath the dual-mode display, according to another embodiment.

FIG. 7 is a flowchart of a method to place the light sensor beneath the dual-mode display, according to another embodiment. In step 700, a processor establishes a correspondence between a camera placed beneath a selectively addressable region of a dual-mode display and the selectively addressable region. In step 710, the processor causes the dual-mode display to become opaque when displaying a display image. In step 720, the processor records an image by the camera while the dual-mode display is displaying the display image. In step 730, during recording the image by the camera, the processor causes the selectively addressable region to stop displaying the display image, such that the selectively addressable region tends to be unnoticeable to a user. For example, for the selectively addressable region to be unnoticeable to the user, the selectively addressable region can be sufficiently small, such as less than 3 mm. Additionally, or alternatively, the selectively addressable region can be turned off for a sufficiently short period of time, such as less than $1/30$ of a second.

In addition to the steps described above, the plurality of cameras disposed beneath the dual-mode display can record a plurality of images. Based on the plurality of images recorded by the plurality of cameras, the processor determines a position of the user's head. Responsive to the position of the user's head, the processor displays a different display image on the dual-mode display.

In addition to determining the position of the user's head, the processor can determine the user's visual focus point on the dual-mode display, based on the plurality of images recorded by the plurality of cameras. Based on the user's visual focus point, the processor can activate a camera in the plurality of cameras closest to the user's visual focus point. Activating the camera includes recording, by the camera, an image of the user. The camera closest to the user's visual focus point is best at capturing user's gaze, and creating an appearance that the user is looking at the conversationalist on the other end of a video call.

The processor can also perform calibration of the camera placed beneath the dual-mode display. When the dual-mode display is not displaying the display image, the camera records a calibration image. When the dual-mode display is displaying the display image, the camera records an image. Based on the calibration image, the processor modifies the recorded image to obtain a final image. For example, the processor can subtract the calibration image from the recorded image to obtain the final image.

Computer

Figure 8:
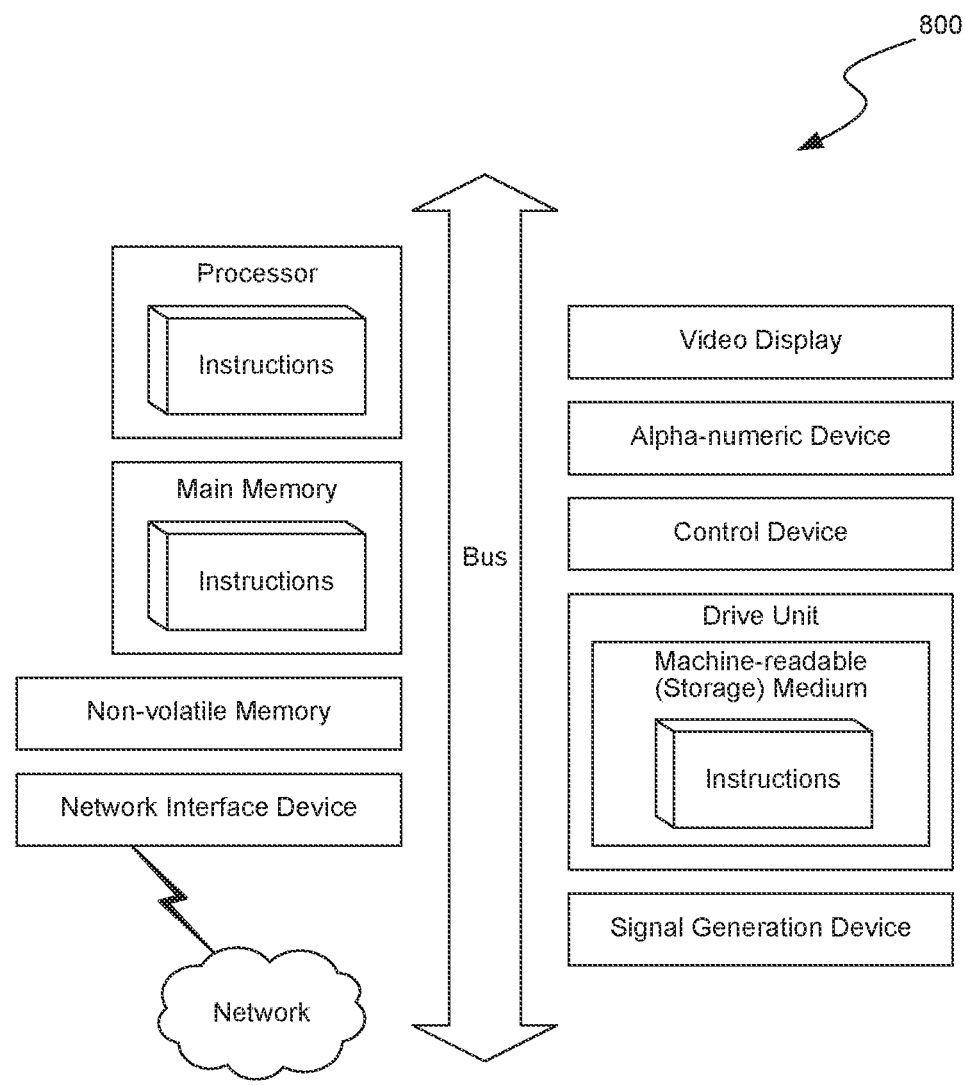
FIG. 8 is a diagrammatic representation of a machine in the example form of a computer system within which a set of instructions, for causing the machine to perform any one or more of the methodologies or modules discussed herein, may be executed.

FIG. 8 is a diagrammatic representation of a machine in the example form of a computer system 800 within which a set of instructions, for causing the machine to perform any one or more of the methodologies or modules discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components described in the example of FIGS. 1-7 (and any other components described in this specification) can be implemented. The computer system 800 can be of any applicable known or convenient type. The components of the computer system 800 can be coupled together via a bus or through some other known or convenient device.

This disclosure contemplates the computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 800. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system comprising:
a dual-mode display operable in an opaque mode when displaying opaque portions of a display image, the dual-mode display operable in a transparent mode when not displaying the display image, the dual-mode display comprising a substantially transparent cathode layer, a plurality of organic light emitting diodes, and a substantially transparent anode layer;
a selectively addressable region associated with the dual-mode display, the selectively addressable region disposed above a camera, the selectively addressable region operable to be transparent when remainder of the dual-mode display is in the opaque mode, and when the selectively addressable region is transparent, the selectively addressable region to allow light to enter the camera, and to allow light to exit the camera;
a first set of electrodes to activate and to deactivate the dual-mode display except the selectively addressable region;
a second set of electrodes to activate and to deactivate the selectively addressable region; and
a display controller to send a first signal and a second signal to the selectively addressable region, the first signal to turn the selectively addressable region transparent, and the second signal to turn the selectively addressable region opaque.

2. The system of claim 1, comprising:
a memory to store an identification associated with a plurality of light emitting elements corresponding to the selectively addressable region, and the memory to communicate the identification associated with the plurality of light emitting elements to the display controller.

3. The system of claim 1, comprising an ambient sensor to measure ambient light, the ambient sensor placed beneath the selectively addressable region, and the display controller to deactivate the selectively addressable region when the ambient sensor activates, such that the inactive selectively addressable region tends to be unnoticeable to a user.

4. The system of claim 1, comprising a proximity sensor to measure distance to an object, the proximity sensor placed beneath a proximity selectively addressable region, and the display controller to deactivate the proximity selectively addressable region when the proximity sensor activates, such that the inactive selectively addressable region tends to be unnoticeable to a user.

5. A system comprising:
a dual-mode display operable in an opaque mode when displaying opaque portions of a display image, the dual-mode display operable in a transparent mode when not displaying the display image;
a selectively addressable region associated with the dual-mode display, the selectively addressable region disposed above a light sensor, the selectively addressable region operable to be transparent when remainder of the dual-mode display is in the opaque mode, and when the selectively addressable region is transparent, the selectively addressable region to allow light to enter the light sensor, and to allow light to exit the light sensor;
a first set of electrodes to activate and to deactivate the dual-mode display except the selectively addressable region;
a second set of electrodes to activate and to deactivate the selectively addressable region; and
a display controller to send a first signal and a second signal to the selectively addressable region, the first signal to turn the selectively addressable region transparent, and the second signal to turn the selectively addressable region opaque.

6. The system of claim 5, the dual-mode display comprising:
a substantially transparent cathode layer;
a plurality of organic light emitting diodes; and
a substantially transparent anode layer.

7. The system of claim 6, comprising a substantially transparent substrate.

8. The system of claim 7, an opaque layer beneath the substantially transparent substrate and the light sensor.

9. The system of claim 6, comprising a thin film transistor (TFT) layer to cause the plurality of organic light emitting diodes to emit light.

10. The system of claim 5, comprising:
a memory to store an identification associated with a plurality of light emitting elements corresponding to the selectively addressable region, and the memory to communicate the identification associated with the plurality of light emitting elements to the display controller.

11. The system of claim 5, comprising an opaque substrate with a transparent region, the transparent region disposed proximate to the light sensor.

12. The system of claim 11, the transparent region comprising a lens associated with the light sensor, the lens to focus incoming light to the light sensor.

13. The system of claim 11, the transparent region comprising a part of the light sensor.

14. The system of claim 5, the light sensor comprising at least one of a camera to record an image of the environment, an ambient sensor to measure ambient light, or a proximity sensor to measure distance to an object.

15. The system of claim 5, the light sensor comprising a plurality of cameras; and a processor configured to:
determine a position of the user's head, based on a plurality of images recorded by the plurality of cameras; and
based on the position of the user's head display a different display image on the dual-mode display.

16. The system of claim 5, the light sensor comprising a plurality of cameras; and a processor configured to:
determine the user's visual focus point on the dual-mode display;
based on the user's visual focus point, activate the one or more cameras closest to the user's visual focus point, to record an image of a user.

17. A method comprising:
configuring a dual-mode display to become opaque when displaying opaque portions of a display image, the dual-mode display to become substantially transparent when not displaying the display image;
placing a light sensor beneath a selectively addressable region associated with the dual-mode display, the light sensor to activate and deactivate, and when the light sensor activates the light sensor to detect a property of incoming light, said placing comprising establishing a correspondence between the light sensor and the selectively addressable region, said establishing the correspondence comprising:
configuring a first set of electrodes to activate and to deactivate the dual-mode display except the selectively addressable region;
configuring a second set of electrodes to activate and to deactivate the selectively addressable region; and
configuring the selectively addressable region to not to display the display image when the light sensor activates while at least a portion of the dual-mode display is displaying opaque portions of the display image, such that the inactive selectively addressable region tends to be unnoticeable to a user.

18. The method of claim 17, said configuring the dual-mode display comprising:
providing a substantially transparent cathode layer;
providing a substantially transparent light emitting layer comprising organic light emitting diodes; and
providing a substantially transparent anode layer.

19. The method of claim 18, comprising providing a thin film transistor (TFT) layer to cause the substantially transparent light emitting layer to emit light.

20. The method of claim 17, said establishing the correspondence between the light sensor and the selectively addressable region comprising:
storing in a memory an identification associated with a plurality of light emitting elements corresponding to the selectively addressable region; and
sending the identification associated with the plurality of light emitting elements to a display controller.

21. The method of claim 17, comprising providing an opaque substrate with a transparent region, the transparent region disposed proximate to the light sensor.

22. The method of claim 21, comprising disposing a lens associated with the light sensor within the transparent region, the lens to focus incoming light to the light sensor.

23. The method of claim 17, comprising:
- placing a plurality of cameras beneath a plurality of portions of the dual-mode display;
- configuring a processor to track the user's head, based on a plurality of images recorded by the plurality of cameras; and
- based on the head tracking configuring the processor to display a different display image on the dual-mode display.

24. The method of claim 17, comprising:
- placing a plurality of cameras beneath a plurality of portions of the dual-mode display;
- configuring a processor to track the user's eyes, based on a plurality of images recorded by the plurality of cameras; and
- based on the eye tracking, activating a camera in the plurality of cameras closest to the user's focus point on the substantially transfer parent display layer, said activating the camera comprising recording, by the camera, an image of the user.

* * * * *